March 11, 1947.  C. F. COAKE  2,417,062
SYSTEM FOR CHECKING CONTOURS
Filed March 5, 1945
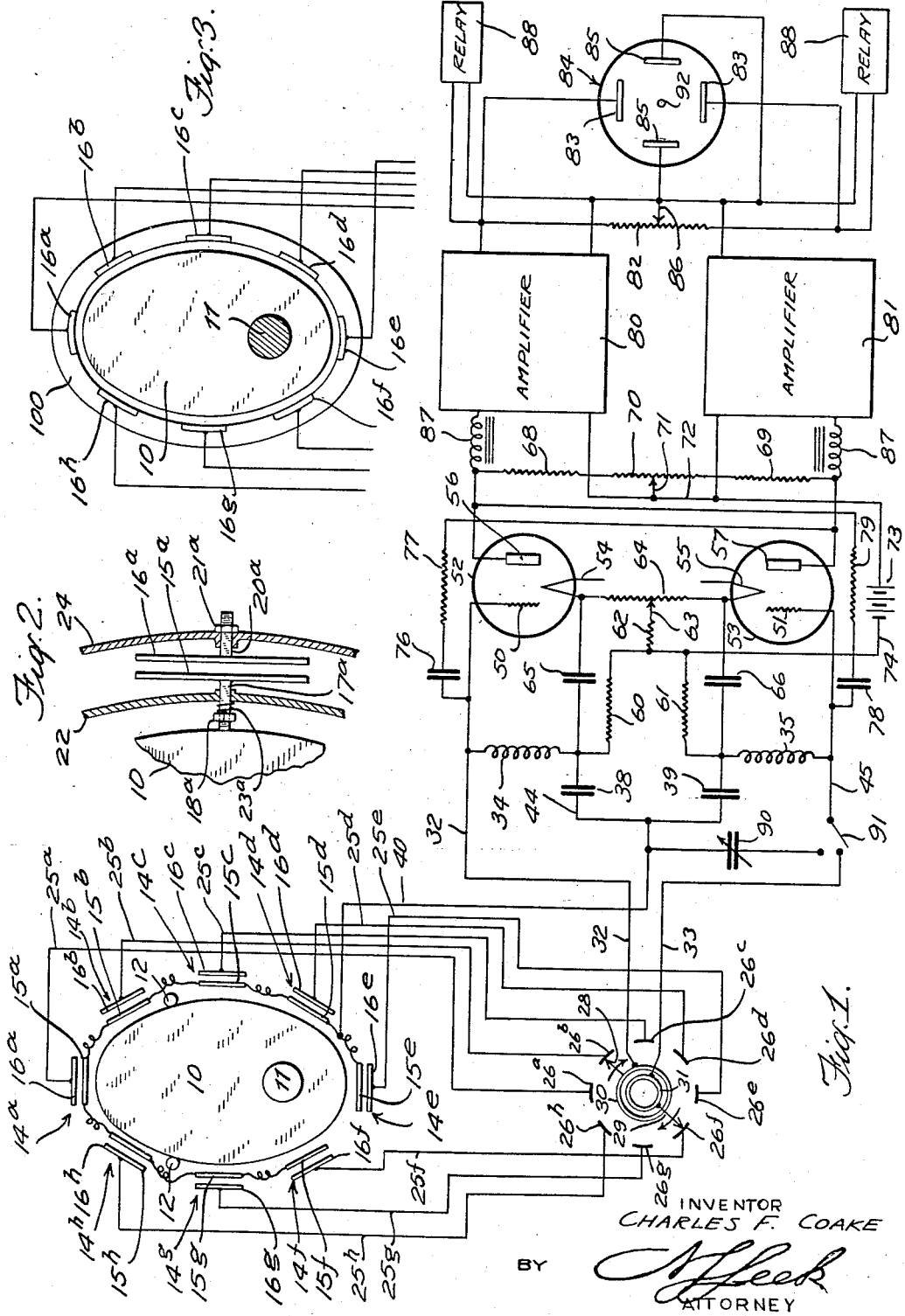
INVENTOR
CHARLES F. COAKE
BY
ATTORNEY Patented Mar. 11, 1947

2,417,062

UNITED STATES PATENT OFFICE 2,417,062

SYSTEM FOR CHECKING CONTOURS

Charles F. Coake, Indianapolis, Ind., assignor to Senn Corporation, New Augusta, Ind., a corporation of Indiana Application March 5, 1945, Serial No. 581,140

8 Claims. (Cl. 33—174)

This invention relates to a system for checking irregular contours to a close degree of tolerance and more particularly to a system for checking both the eccentricity and the size of irregular cams.

An object of the invention is to provide a system of the above type which is suited to the accurate and rapid checking of production parts by comparatively unskilled operators.

Various other objects and advantages will be apparent as the nature of the invention is more fully disclosed.

In accordance with the present invention, the part to be checked is placed on a measuring stand carrying a plurality of variable impedance devices which are disposed around the periphery of the part and are arranged so that their impedances vary as functions of the displacements of the corresponding portions of the periphery from a given standard or check part. If the impedances are preadjusted to equal values when the contour conforms to that of the standard any variations from this value will indicate corresponding variations in the contour of the part.

In one embodiment the impedances comprise a set of condensers disposed around the periphery of the part and having variable plates positioned in accordance with the contour. If the part is conducting it may constitute a common plate and may cooperate with a set of spaced plates disposed about but insulated therefrom to form the condensers. In the case of a part of magnetic material the impedances may comprise coils, the impedance of which depend upon the spacing of each coil from the magnetic part.

The impedances are connected to a commutator having rotating brushes arranged to close the circuit to successive impedances in sequence. For measuring eccentricities the impedances are connected in diametrically opposite pairs whereas for measuring size the impedances are successively connected individually for comparison with a standard impedance.

The impedances may be utilized to control a vacuum tube measuring circuit which, in the embodiment disclosed, comprises a pair of vacuum tubes connected for operation as a push-pull oscillator and arranged to be in balance when the respective impedances are equal, but to draw different space currents in response to variations in such impedances. The output of the push-pull oscillator is connected through an amplifier if desired, to control a cathode ray oscilloscope so that the deflection of the spot on the oscilloscope screen indicates the condition of the contours being measured.

Although the novel features which are believed to be characteristic of this invention are pointed out more particularly in the claims appended hereto, the invention may be better understood by referring to the following description, taken in connection with the accompanying drawings, in which a specific embodiment thereof has been set forth for purposes of illustration.

In the drawings,

Figure 1 is a schematic diagram of a circuit embodying the present invention;

Figure 2 is an enlarged detail view of one of the variable condensers of the checking circuit of Fig. 1; and Fig. 3 is a schematic diagram of a modified condenser plate arrangement.

Referring to the drawing more in detail, a part 10 such as a cam of irregular contour or a bearing or the like which is to be checked is shown as positioned on a fixture shown as a locating pin 11 and between dowel pins 12 which are arranged to accurately position the cam 10. It is to be understood that one of the pins 12 may be spring pressed for accurately positioning the part. A plurality of dowel pins 12 may be used if desired.

In the embodiment shown a plurality of condensers 14a to 14h are provided which are formed by plates 15a to 15h and 16a to 16h respectively. The plates 15a to 15h are shown as mounted on pins 17a to 17h which slide in a supporting flange 22 (Fig. 2) and which may be adjusted by adjusting nuts 18a to 18h. The pins 17a to 17h are held against the periphery of the cam 10 by springs 23a to 23h (Fig. 2). The plates 16a to 16h are shown as mounted on pins 20a to 20h which are adjustably supported in a flange 24 by adjusting nuts 21a to 21h. The positions of the plates 16a to 16h are preadjusted in accordance with a standard part 10 so that the condensers 14a to 14h are normally of equal capacity.

It is to be understood that the condensers 14a to 14h are spaced around the periphery of the cam 10 and that any suitable number of condensers may be employed. Eight have been shown merely for purposes of illustration.

In the embodiment shown the plates 16a to 16h are connected individually by lines 25a to 25h to segments 26a to 26h of a commutator. A pair of brushes 28 and 29 are mounted for engagement with diametrically opposite segments of said commutator and are caused to rotate around said commutator by suitable means (not shown) at a predetermined speed. The brushes 28 and 29 are connected to slip rings 30 and 31 which are connected respectively by lines 32 and 33 to one side of coils 34 and 35, the other sides of which are connected through condensers 38 and 39 respectively and a common line 40 to all of the plates 15a to 15h of the various condensers 14a to 14h. The arrangement is such that the condenser 38, the coil 34 and the condenser connected in circuit by the brush 28 constitute a tuned circuit 44, and the condenser 39, the coil 35 and condenser connected in circuit by the brush 29 constitute a tuned circuit 45.

The coils 34 and 35 are connected respectively to the grids 50 and 51 of space discharge tubes 52 and 53 having cathodes 54 and 55 respectively and anodes 56 and 57 respectively. The grid return sides of the coils 34 and 35 are connected respectively through resistors 60 and 61 and a common resistor 62 to the variable tap 63 of a potentiometer 64, the ends of which are connected to the cathodes 54 and 55. The resistors 60, 61, 62 and 64 are by-passed to the cathodes 54 and 55 by condensers 65 and 66 which are of a size to produce a rapid response. The plates 56 and 57 are connected across a resistance network comprising fixed resistors 68 and 69 and a potentiometer 70 in series. The variable tap 71 of the potentiometer 70 is connected by a line 72 to a source 73 of plate potential, the negative end of which is connected by a line 74 to the common point of the resistors 60, 61 and 62 so that the resistor 62 constitutes a source of cathode bias.

The grids and plates of the tubes 52 and 53 are cross connected by feedback networks comprising condenser 76 and resistor 77 connected in series between the grid 50 and the plate 57, and a condenser 78 and resistor 79 connected in series between the grid 51 and the plate 56.

The outputs of the tubes 52 and 53 are shown as connected to D. C. amplifiers indicated by rectangles 80 and 81, the outputs of which are connected across a potentiometer 82 and to horizontal plates 83 of a cathode ray oscilloscope 84 having vertical plates 85 connected to the variable tap 86 of the potentiometer 82. It is to be understood that if the amplifier 80, 81 is not required the cathode ray oscilloscope may be connected directly in the output circuit of the tubes 52 and 53. Chokes 87 are connected in the input leads to the amplifiers 80 and 81 to eliminate the A. C. component. The chokes 87 may be omitted and the amplifiers 80 and 81 operated as A. C. amplifiers to permit the oscilloscope to be connected to indicate relative phase change or voltage change or both.

Relays 88 of any suitable type, such as the limit circuits shown in my copending application Serial No. 579,627, filed February 24, 1945, for Microlimit indicating system (Case 4) may be connected to the D. C. amplifier outputs for actuating any desired indicating or control circuits.

A standard condenser 90 is shown as connected in the tuned circuit 45 by means of a switch 91 which is adapted to connect the coil 35 to either the condenser 90 or to the brush 29. The switch 91 makes it possible to utilize the circuit for checking either the eccentricity or the size of the part 10 as will be hereinafter explained.

In the operation of this device for checking the part 10 which may constitute a cam of irregular contour or a bearing or the like of regular contour, the condensers 14a are preadjusted by placing a standard part 10 in position and setting the adjustable plates 16a to 16h so that all of the condensers are of equal capacity as indicated by the cathode ray oscilloscope 83 in the manner to be described. After this adjustment has been made, the standard part 10 is removed, the part to be checked is inserted in place thereof, and the brushes 28 and 29 are rotated by suitable means so as to successively connect diametrically opposite pairs of condensers 14a to 14h between the lines 32 and 40 and the lines 33 and 40 respectively. These condensers thus form parts of the tuned circuits 44 and 45 respectively.

The tubes 52 and 53 are interconnected by the feedback networks 76, 77 and 78, 79 to operate as a push-pull oscillator. The tap 63 of the potentiometer 64 is adjusted so that the operation of the tubes 52 and 53 are in balance when the tuned circuits 44 and 45 have identical characteristics. The coils 34 and 35 and the condensers 44 and 45 are so chosen that this condition occurs when the respective condensers 14a to 14h, which form a part of the tuned circuits, are of identical capacity.

Under these conditions of balanced operation, equal grid currents are drawn by the tubes 52 and 53, equal grid biases are produced by the resistors 60 and 61 and equal plate currents are drawn by the respective tubes. The variable tap 71 of the potentiometer 70 may be adjusted so that under these conditions the two ends of the resistor network 68, 69 and 70 are at equal potential. With the amplifiers 80 and 81 having identical characteristics, the two ends of the potentiometer 82 are likewise of equal potential and equal potentials are applied to the two horizontal plates 83 of the cathode ray oscilloscope 84 and will cause the spot, indicated at 92, to remain in the center of the screen. Suitable adjustment may be made of the variable tap 86 to compensate for any variations in the parts and to cause the spot 92 to assume a predetermined zero position.

As long as the successive pairs of condensers which are connected into the circuit by the brushes 28 and 29 are of equal capacities, the spot 92 will remain in the center of the screen as above stated. If, however, one of the condensers of a pair is of different capacity, the tuned circuits 44 and 45 no longer have identical characteristics and the operation of the tubes 52 and 53 becomes unbalanced so that unequal grid currents and unequal space currents are drawn. Consequently, a potential difference exists across the two ends of the resistor networks 68, 69 and 70 and across the potentiometer 82 which will serve to deflect the spot 92 toward one of the plates 83 by an amount proportional to the unbalance between the condensers 14a to 14h which are then connected in circuit. Such an unbalance will indicate that the cam 10 is eccentric with respect to the contour of the standard part by which the condensers 14a to 14h were originally adjusted. This eccentricity is measured independently of the actual diameter of the cam at the points under measurement. In other words, the cam may be of the correct diameter at all points and may still be eccentric with respect to the standard of measurement.

In making the above measurement it is only necessary for the operator to insert the cam 10 and then to watch the spot 92 while the brushes 28 and 29 are being rotated. If the eccentricity of all parts of the cam is correct, the spot 92 will remain at the zero position in the center of the screen. Any deflection of the spot 92, however, as the brushes 28 and 29 are rotated indicates that the cam is eccentric at one or more points.

The permissible eccentricity may be indicated by suitable marks on the screen over which the spot 92 passes so that if the line traced by the spot passes the limit marks, the operator will know that the part 10 must be discarded.

It is possible that the part 10 may be of the proper eccentricity determined by the above described measurement but that the entire part may be undersize or oversize so that the capacities of all of the condensers 14a to 14h are increased or decreased by the same amount. In order to check on the size, the switch 91 is thrown to disconnect the line 33 and to connect the standard condenser 90 in the tuned circuit 45. The condenser 90 has been preset in accordance with the standard part so that its capacity is identical with the preset capacities of the individual condensers 14a to 14h. With the brushes 28 and 29 rotating as above mentioned it will be noted that the brush 29 is electrically idle and that the brush 28 serves to connect the condensers 14a to 14h successively in the tuned circuit 44. The system now serves to compare the capacities of these condensers successively with the capacity of the standard condenser 90 and if the capacities are all equal the spot 92 will remain in the center of the screen as above mentioned. However, if the capacities of any or all of the condensers 14a to 14h are above or below the standard capacity, the spot 92 will be deflected accordingly. If all of the condensers are of the same capacity, and differ from the capacity of the condenser 90 the spot 92 will remain stationary at a point displaced from the zero position. The displacement thus represents the amount by which the part 10 is undersize or oversize. Of course, if the part 10 is undersize or oversize at only certain points this will produce a deflection of the spot 92 as the brush 28 connects the corresponding condenser in circuit.

It is thus evident that the operator may check separately both the size and the eccentricity of the part 10 by throwing a switch 91 first to one position and then to the other and observing the spot 92 on the cathode ray oscilloscope screen. However, both size and eccentricity may be checked simultaneously using the standard condenser 90 as above mentioned. If the spot remains displaced the eccentricity is correct but the part is undersize or oversize according to the position of the spot. If the spot vibrates or forms a line the part is eccentric at the corresponding point.

This system is particularly useful for measuring parts such as cams having an extremely irregular contour and permits substantially any selected contour to be accurately and rapidly checked.

Obviously, if the part 10 is made of conducting material, the plates 15a to 15h may be omitted and the part 10 itself may constitute the common plate as shown in Fig. 3. For the checking of production parts the plates 16a to 16h may be fixed in the walls of a member surrounding the part 10 and having a recess in which the part 10 is to be inserted. In Fig. 3 plates 16a to 16h are set in a ring of plastic or other insulating material 100 and are set so that their faces are equally spaced from the periphery of the part 10 when the part is of standard dimension. This form has the advantage of maintaining its adjustment for long periods of time and facilitates the insertion and removal of part 10 from the measuring platform.

In the case of an inductance checking circuit the plates 16a to 16h of Fig. 3 may be replaced by coils which are similarly disposed and are magnetically coupled to the part 10 so that their impedances are determined by the spacing of the periphery of the part at the respective positions. Suitable adjusting means may be provided for setting the plates 16a to 16h of Fig. 3 or the coils referred to above to conform to the contour of the selected standard part.

Although certain specific embodiments of the invention have been set forth for purposes of illustration it is to be understood that the invention is capable of various uses and adaptations as will be readily apparent to a person skilled in the art. The invention is only to be limited in accordance with the scope of the following claims.

What is claimed is:

1. A system for checking contours of articles, comprising locating means to receive and hold said article in a predetermined position, a plurality of impedances disposed about the periphery of said article and independently adjustable in response to variations in the contour thereof, an impedance measuring circuit comprising a pair of space discharge devices having individual tuned input circuits, a cross-connected feedback network connecting said devices for oscillation in unison as a push-pull oscillator and normally adjusted for balanced operation, means connecting said impedances successively in at least one of said tuned circuits for causing unbalanced operation when the impedance thereof varies from a predetermined value, and means responsive to the condition of balance or unbalance in said operation.

2. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, means connecting said condensers successively in at least one of said tuned circuits for causing unbalanced operation when the capacity thereof varies from a predetermined value, and means responsive to the condition of balance or unbalance in said operation.

3. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuit, a cross-connected feedback network connecting said devices for oscillation in unison as a push-pull oscillator and normally adjusted for balanced operation, means connecting said condensers successively in one of said tuned circuits for causing unbalanced operation when the capacity thereof varies from a predetermined value, and means to indicate the condition of balance or unbalance in said operation.

4. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, means connecting said condensers successively in pairs to said tuned circuits for causing unbalanced operation when the capacities thereof are unequal, and means responsive to said unbalanced operation of said devices.

5. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, means connecting said condensers successively in pairs to said tuned circuits for causing unbalanced operation when the capacities thereof are unequal, and a cathode ray oscilloscope having control means connected to cause a deflection corresponding to said unbalanced operation of said devices.

6. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, a standard capacity connected in one of said tuned circuits, means connecting said condensers successively in the other of said tuned circuits for causing unbalanced operation when the capacity thereof varies from that of said standard capacity, and means responsive to the condition of balance or unbalance in said operation.

7. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, means connecting said condensers successively in pairs to said tuned circuits for causing unbalanced operation when the capacities thereof are unequal, means responsive to said unbalanced operation of said devices, and means disconnecting one of said condensers of each pair and connecting a standard capacity in the corresponding tuned circuit for checking the size of said article.

8. A system for checking contours of articles, comprising locating means to receive and hold said article in a predetermined position, a plurality of condensers disposed about the periphery of said article and independently adjustable in response to variations in the contour thereof, a capacity measuring circuit comprising a pair of space discharge devices having individual tuned input circuits, a cross-connected feedback network connecting said devices for oscillation in unison as a push-pull oscillator and normally adjusted for balanced operation, means connecting said condensers successively in pairs to said tuned circuits for causing unbalanced operation when the capacities thereof are unequal, a cathode ray oscilloscope having control means connected to cause a deflection corresponding to said unbalanced operation of said devices, and means disconnecting one of said condensers of each pair and connecting a standard capacity in the corresponding tuned circuit for checking the size of said article.

CHARLES F. COAKE.

REFERENCES CITED

The following references are of record in the file of this patent:

UNITED STATES PATENTS

| Number | Name | Date |
|---|---|---|
| 1,766,991 | Gardner | June 24, 1930 |
| 2,146,442 | Price | Feb. 7, 1929 |
| 2,274,735 | Peters | Mar. 3, 1942 |
| 2,186,826 | Edgar | Jan. 9, 1940 |

FOREIGN PATENTS

| Number | Country | Date |
|---|---|---|
| 654,908 | Germany | Jan. 4, 1938 |